(12) United States Patent
Gilbert (10) Patent No.: US 11,915,022 B2
(45) Date of Patent: Feb. 27, 2024

(54) REDUCING MEMORY INCONSISTENCIES BETWEEN SYNCHRONIZED COMPUTING DEVICES

(71) Applicant: Red Hat, Inc., Raleigh, NC (US)

(72) Inventor: David A. Gilbert, Manchester (GB)

(73) Assignee: Red Hat, Inc., Raleigh, NC (US)

( * ) Notice: Subject to any disclaimer, the term of this patent is extended or adjusted under 35 U.S.C. 154(b) by 1120 days.

(21) Appl. No.: 15/098,910

(22) Filed: Apr. 14, 2016

(65) Prior Publication Data
US 2017/0300245 A1   Oct. 19, 2017

(51) Int. Cl.
*G06F 9/455*     (2018.01)
*G06F 11/16*     (2006.01)
*G06F 11/20*     (2006.01)

(52) U.S. Cl.
CPC ........ *G06F 9/45558* (2013.01); *G06F 11/165* (2013.01); *G06F 11/1637* (2013.01); *G06F 11/1666* (2013.01); *G06F 11/1675* (2013.01); *G06F 11/2035* (2013.01); *G06F 11/2048* (2013.01); *G06F 11/2082* (2013.01); *G06F 2009/45583* (2013.01); *G06F 2201/815* (2013.01)

(58) Field of Classification Search
CPC ...... G06F 3/0619; G06F 3/0662; G06F 3/065; G06F 3/0683; G06F 9/45558; G06F 11/1666; G06F 11/2082; G06F 2009/45583
See application file for complete search history.

(56) References Cited

U.S. PATENT DOCUMENTS

| | | | |
|---|---|---|---|
| 7,440,982 B2 * | 10/2008 | Lu .................. | G06F 11/1448 |
| 8,117,496 B2 | 2/2012 | Bashir et al. | |
| 8,135,930 B1 | 3/2012 | Mattox et al. | |
| 8,549,210 B2 | 10/2013 | Hunter et al. | |
| 8,805,788 B2 | 8/2014 | Gross, IV et al. | |
| 8,812,907 B1 | 8/2014 | Bissett et al. | |
| 9,032,248 B1 | 5/2015 | Petty et al. | |
| 2006/0172724 A1 * | 8/2006 | Linkert ............... | G06Q 10/10 |
| | | | 455/412.1 |

(Continued)

OTHER PUBLICATIONS

Hunter, vSphere Replication Synchronization Types,, VMware vSphere Blog, Jun. 19, 2015 [retrieved from internet Apr. 24, 2018][<URL:https://blogs.vmware.com/vsphere/2015/06/vsphere-replication-synchronization-types.html>] (Year: 2015).*

(Continued)

*Primary Examiner* — David Yi
*Assistant Examiner* — Nicholas A. Paperno
(74) *Attorney, Agent, or Firm* — Dority & Manning, P.A.

(57) ABSTRACT

Mechanisms for reducing memory inconsistencies between two synchronized computing devices are provided. A first hypervisor module of a first computing device iteratively determines that content of a memory page of a plurality of memory pages has been modified. The content of the memory page is sent to a second hypervisor module on a second computing device. At least one other memory page of the plurality of memory pages is identified, and a verification value based on the content of the at least one other memory page is generated. The verification value and a memory page identifier that identifies the at least one other memory page is sent to the second hypervisor module on the second computing device.

18 Claims, 5 Drawing Sheets

(56) References Cited

U.S. PATENT DOCUMENTS

| | | | | |
|---|---|---|---|---|
| 2010/0318991 A1* | 12/2010 | Venkitachalam | ... | G06F 9/45533 718/1 |
| 2013/0067270 A1* | 3/2013 | Lee | ..................... | G06F 11/2094 714/6.1 |
| 2013/0232498 A1* | 9/2013 | Mangtani | .............. | G06F 9/5072 718/104 |
| 2015/0143064 A1* | 5/2015 | Bhargava | ............ | G06F 11/1451 711/162 |

OTHER PUBLICATIONS

Ferreira, Kurt B. et al., "libhashckpt: Hash-based Incremental Checkpointing Using GPU's," Recent Advantages in the Message Passing Interface, September Springer, 2011, pp. 272-281.

Knauth, Thomas et al., "VeCycle: Recycling VM Checkpoints for Faster Migrations," Proceedings of the 16th Annual Middleware Conference, ACM, Dec. 2015, 12 pages.

Vasavada, Manav et al., "Comparing different approaches for Incremental Checkpointing: The Showdown," 2011 Linux Symposium, Linux'11: The 13th Annual Linux Symposium, Jun. 2011, pp. 69-79.

Vogt, Dirk et al., "Speculative Memory Checkpointing," Proceedings of the 16th Annual Middleware Conference, ACM, Dec. 2015, 13 pages.

* cited by examiner

REDUCING MEMORY INCONSISTENCIES BETWEEN SYNCHRONIZED COMPUTING DEVICES

TECHNICAL FIELD

The examples relate generally to fault tolerant computing devices and, in particular, to reducing memory inconsistencies between two synchronized computing devices.

BACKGROUND

Maintaining a synchronized copy of a dynamically changing memory of a first computing device on a second computing device may be useful in the event of a failure of the first computing device. In the event of such a failure, if the synchronized copy of the memory on the second computing device is an exact copy of the memory on the first computing device, the second computing device may, with little delay, continue to provide the functionality previously provided by the first computing device at the point in time that the first computing device failed.

SUMMARY

The examples provide mechanisms for reducing memory inconsistencies between two synchronized computing devices. In particular, memory pages on a first computing device are identified and a first verification signature, such as a checksum, is generated based on the content of the memory pages. Memory page identifiers that identify the memory pages and the first verification signature are sent to a second computing device that had previously been provided copies of the content of the same memory pages. The second computing device generates a second verification signature based on content of the same memory pages in a memory of the second computing device, and compares the second verification signature to the first verification signature. If the two verification signatures match, then the identified memory pages are the same on both computing devices. If the two verification signatures do not match, then the content of one or more of the memory pages on the second computing device do not match the content of one or more memory pages on the first computing device. In such event, the second computing device may take an action, such as generating an alert to an operator or requesting copies of the content of the memory pages from the first computing device. This process may be performed iteratively, such as during each memory checkpoint, and may be performed continuously, so that the memories of the two computing devices are being analyzed for inconsistencies on a continuous basis.

In one example, a first computing device is provided. The first computing device includes a memory comprising a plurality of memory pages. The first computing device further comprises a processor device coupled to the memory. A first hypervisor module interfaces with the processor device and iteratively determines that content of a memory page of the plurality of memory pages has been modified. The first hypervisor module sends the content of the memory page to a second hypervisor module on a second computing device. The first hypervisor module identifies at least one other memory page of the plurality of memory pages and generates a verification value based on content of the at least one other memory page. The first hypervisor module sends the verification value and a memory page identifier that identifies the at least one other memory page to the second hypervisor module on the second computing device.

In another example, a method is provided. The method includes iteratively, by a first hypervisor module executing on a first computing device comprising a processor device, determining that content of a memory page of a plurality of memory pages has been modified. The method further includes sending the content of the memory page to a second hypervisor module on a second computing device. The method further includes identifying at least one other memory page of the plurality of memory pages and generating a verification value based on content of the at least one other memory page. The method further includes sending the verification value and a memory page identifier that identifies the at least one other memory page to the second hypervisor module on the second computing device.

In another example, another first computing device is provided. The first computing device includes a memory comprising a plurality of memory pages. The first computing device also includes a processor device coupled to the memory and a first hypervisor module that interfaces with the processor device. The first hypervisor module is to iteratively determine that content of memory pages in a first set of memory pages of the plurality of memory pages has been modified. The first hypervisor module sends content of each memory page in the first set of memory pages to a second hypervisor module on a second computing device. The first hypervisor module randomly identifies a second set of memory pages from the plurality of memory pages and generates a verification value based on content of the second set of memory pages. The first hypervisor module sends a group of memory page identifiers, each memory page identifier identifying a corresponding one of the memory pages in the second set of memory pages, and the verification value to the second hypervisor module.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first verification signature" and "second verification signature," or "first hypervisor module" and "second hypervisor module" and does not imply a priority, a type, an importance, or other attribute, unless otherwise stated herein.

As used herein and in the claims, the articles "a" and "an" in reference to an element refers to "one or more" of the element unless otherwise explicitly specified.

Maintaining a synchronized copy of a dynamically changing memory of a first computing device on a second computing device may be useful in the event of a failure of the first computing device. In the event of such a failure, if the synchronized copy of the memory on the second computing device is an exact copy of the memory on the first computing device, the second computing device may, with little delay, continue to provide the functionality previously provided by the first computing device at the point in time that the first computing device failed.

Dynamic memory, often referred to as random access memory (RAM), is typically accessed in units sometimes referred to as memory pages. Processes, such as application modules, operating systems, and the like, running on computing devices may modify memory pages in the course of providing whatever functionality such processes provide. One synchronization mechanism involves a checkpoint process, wherein the first computing device periodically sends modified memory pages to the second computing device.

However, even though the first computing device may send memory pages to the second computing device such that the memory pages in the second computing device should have the same content as those in the first computing device, in practice, the memory pages in the two computing devices may not be identical for any number of reasons. For example, if the checkpoint process does not utilize a verification signature, such as a checksum, the content transfer process itself may inadvertently corrupt the content of the memory pages. Memory pages may also become corrupted if an executing process on the second computing device alters a memory page that should not have been altered. Electromagnetic fields in proximity to the second computing device may alter the content of a memory page. A failing memory chip may result in the content of a memory page being altered.

If the content of the memory pages in the second computing device is different from that in the first computing device, this may prevent the second computing device from operating in place of the first computing device in the event the first computing device fails.

The examples provide mechanisms for reducing memory inconsistencies between two synchronized computing devices. In particular, memory pages on a first computing device are identified and a first verification signature, such as a checksum, is generated based on the content of the memory pages. The first verification signature and memory page identifiers that identify the memory pages are sent to a second computing device that had previously been provided copies of the same memory pages. The second computing device generates a second verification signature based on the content of the same memory pages in the memory of the second computing device, and compares the second verification signature to the first verification signature. If the two verification signatures match, then the identified memory pages are the same on both computing devices. If the two verification signatures do not match, then one or more of the memory pages on the second computing device do not match the memory pages on the first computing device. In such event, the second computing device may take an action, such as generating an alert to an operator, or requesting copies of the memory pages from the first computing device. This process may be performed iteratively, such as during each memory checkpoint, and may be performed continuously, so that the memories of the two computing devices are being analyzed for inconsistencies on a continuous basis.

Among other features, the examples eliminate a need to generate a verification signature based on the content of all memory pages at once, periodically, to ensure consistency between the two computing devices. Generating a verification signature based on the content of all memory pages is time-consuming, and may lead to relatively substantial intervals during which processing is halted while the verification signature is generated. The examples, by continuously generating verification signatures for relatively small amounts of memory, ensure that the memory between the two computing devices is synchronized while avoiding a need to pause processing periodically for a substantial interval of time.

Figure 1:
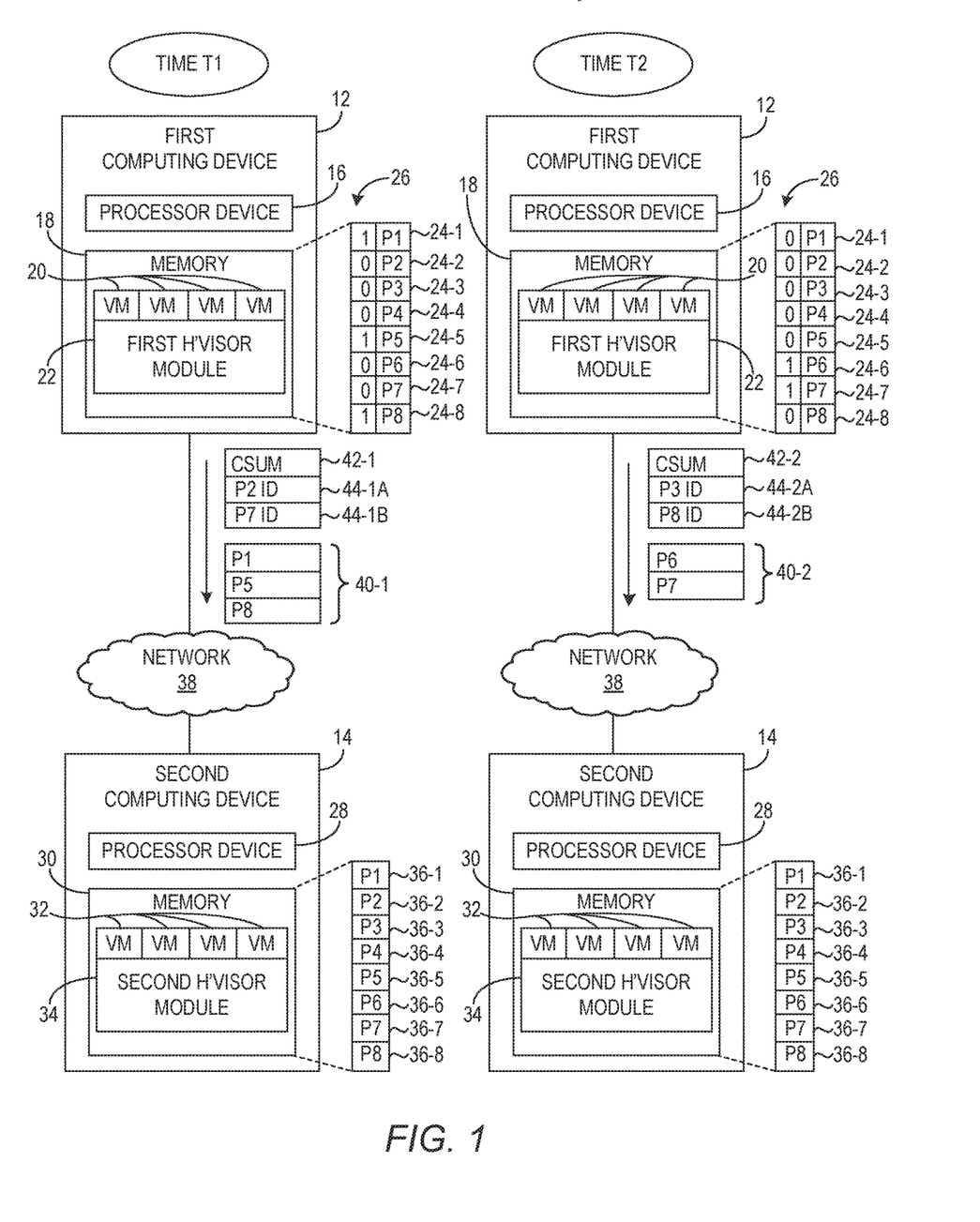
FIG. 1 is a block diagram of an environment in which examples may be practiced.

FIG. 1 is a block diagram of an environment 10 in which examples may be practiced. The environment 10 is illustrated at two successive periods of time, a time T1 and a time T2. The environment 10 includes a first computing device 12 and a second computing device 14. The first computing device 12 includes a processor device 16 and a memory 18. Loaded into the memory 18 are one or more virtual machines 20 (generally, VMs 20). Each VM 20 operates completely or substantially independently of each other VM 20. Each VM 20 includes complex software instructions that are executed by the processor device 16. While for purposes of illustration, only one processor device 16 is illustrated, the first computing device 12 may have any number of processor devices 16. Similarly, while four VMs 20 are illustrated for purposes of illustration, the memory 18 may contain any number of VMs 20.

Each VM 20 may provide services to one or more processes (not illustrated). In particular, each VM 20 may comprise a separate operating system instance, and each operating system instance may provide services to any number of processes. The memory 18 also contains a first hypervisor module 22 that similarly comprises complex software instructions that interfaces with the processor device 16 to provide functionality described herein. In some examples the processor device 16 and the first hypervisor module 22 may be relatively tightly coupled such that circuitry of the processor device 16 is programmed to invoke the first hypervisor module 22 upon the occurrence of certain events, such as, by way of non-limiting example, an attempt to access the memory 18 by a VM 20. Among other features, the first hypervisor module 22 operates to ensure that each VM 20 has access to a portion of the memory 18, but cannot access a portion of the memory 18 to which another VM 20 has access.

The memory 18 is divided into a plurality of units referred to herein as memory pages. In this example, the memory 18 is illustrated as having eight memory pages 24-1-24-8 (generally, memory pages 24). The size of the memory pages 24 may be any desired size. For example, each memory page 24 may be 1024 bytes (1 kilobyte (kB)) in size. The memory 18 may have a substantial number of memory pages 24. For example, if the memory 18 is eight gigabytes (GB) in size, and the memory pages 24 are 1 kB in size, then the memory 18 has eight million memory pages 24. The memory pages 24 store content, such as binary data. The data may be any data useful for the first computing device 12 to implement desired functionality. By way of non-limiting example, some of the memory pages 24 contain executable instructions of processes executing on the processor device 16. Other memory pages 24 contain data used and/or generated by processes running in the VMs 20. Each memory page 24 may include an associated "dirty bit" 26, which, for purposes of clarity, is illustrated as being separate from the memory pages 24 but, in practice, may be part of the associated memory page 24. The dirty bit 26 is set (e.g., given a value of '1') if any content of the associated memory page 24 is altered. The dirty bit 26 may be set, for example, by the processor device 16, the first hypervisor module 22, and/or an operating system executing on the processor device 16. The dirty bit 26 of an associated memory page 24 can be reset (e.g., given a value of '0') at a first point in time and subsequently checked at a second point in time. If at the second point in time the dirty bit 26 has a value of '1', then the associated memory page 24 was altered at some point between the first point in time and the second point in time.

The second computing device 14 serves as a backup computing device for the first computing device 12. Ideally, if the processor device 16 fails, or if a VM 20 fails, the second computing device 14 may provide identical services at a point in time in close proximity to the point in time of the failure.

The second computing device 14 contains a processor device 28 and a memory 30. The memory 30 includes a plurality of VMs 32, each of which corresponds to one of the VMs 20. The memory 30 also includes a second hypervisor module 34. The memory 30, or portions thereof, are intended to be exact copies of corresponding portions of the memory 18, such that upon a failure of the first computing device 12, or a VM 20, the second computing device 14 can, nearly instantaneously, provide identical services that were provided by the first computing device 12 prior to the failure. The memory 30 includes a plurality of memory pages 36-1-36-8 (generally, memory pages 36), each of which corresponds to a particular memory page 24-1-24-8. The correspondence of the memory pages 24-1-24-8 to the memory pages 36-1-36-8 may be based on any desired criteria, such as, by way of non-limiting example, memory page location.

To synchronize the memory pages 24 on the first computing device 12 with the memory pages 36 on the second computing device 14, the first computing device 12 performs an iterative checkpoint process. The checkpoint process may be performed at any desired periodic or intermittent rate. For example, the checkpoint process may be performed 10 times each second. At the beginning of the checkpoint process, the first computing device 12 pauses the processor device 16 from performing any additional actions other than those associated with the checkpoint process. The first computing device 12 then sends the content of all the memory pages 24 to the second hypervisor module 34 via a network 38, or other communications path between the first computing device 12 and the second computing device 14. The first hypervisor module 22 resets the dirty bit 26 of each memory page 24 to a value of '0'.

The second hypervisor module 34 receives the content of the memory pages 24 and copies the content of the memory pages 24 to the corresponding memory pages 36, and thus, ideally, the content of the memory pages 36 are exact copies of the content of the memory pages 24. Due to the number and size of the memory pages 24, this may take a relatively substantial period of time, and thus, copying the entire content of the memory pages 24 at each checkpoint would be undesirable.

For each subsequent iteration, the first hypervisor module 22 pauses the processor device 16, identifies those memory pages 24 that have content that has been altered since the previous iteration based on the dirty bits 26, and sends the content of those memory pages 24 to the second hypervisor module 34. The first hypervisor module 22 then resets the dirty bits 26 of such memory pages 24 and directs the processor device 16 to continue processing. Because only a relatively small percentage of the content of the memory pages 24 are likely to have been modified between iterations, the checkpoint process is relatively quick after the first checkpoint.

Unfortunately, despite the checkpoint process, it is possible for the content of the memory pages 36 to differ from the content of the memory pages 24, which may prevent the second computing device 14 from serving as a backup computing device for the first computing device 12. For example, if the checkpoint process does not utilize a verification signature, such as a checksum, to ensure that the content sent from the first computing device 12 was exactly the same content received by the second computing device 14, the content transfer process itself may inadvertently corrupt the content of the memory pages 24. The memory 30 may also become corrupted if an executing process on the second computing device 14 alters the content of a memory page 36 that should not have been altered. Electromagnetic fields in proximity to the second computing device 14 may alter the content of a memory page 36. A failing memory chip may result in a memory page 36 being altered.

The examples discussed herein reduce or eliminate any such memory inconsistencies between the memory pages 24 and the memory pages 36 in the following manner. At an iteration at time T1, the first hypervisor module 22 determines that a set 40-1 of the memory pages 24-1, 24-5, and 24-8 have been modified based on the associated dirty bits 26, each of which has a value of '1' at the time T1. For purposes of brevity, as discussed herein, actions relating to a memory page include the content of the memory page. For example, a discussion herein of sending a memory page 24 refers to the sending of the content of the particular memory page 24. Similarly, a discussion herein of determining whether a memory page has been altered refers to whether the content of the memory page has been altered. The first hypervisor module 22 sends the set 40-1 of the memory pages 24-1, 24-5, and 24-8 to the second hypervisor module 34. The first hypervisor module 22 then identifies at least one other memory page 24. In this example, the first hypervisor module 22 identifies a second set of memory pages 24-2 and 24-7. In some examples, the second set may include memory pages 24 that have not been altered since the previous iteration. In other examples, the memory pages 24 may be any memory pages 24. In some examples, the memory pages 24 may be identified randomly. The number of memory pages 24 in the second set may be based on any desired criterion or criteria, including, by way of non-limiting example, a total size of the memory 18, a bandwidth of the communications channel between the first computing device 12 and the second computing device 14, a predetermined period of time, a predetermined number of memory pages 24, or any combination thereof.

The first hypervisor module 22 generates a verification value 42-1 based on the content of the memory pages 24-2, 24-7. The verification value 42-1 may comprise any value, such as a hash or checksum value, that is based on the content of the memory pages 24-2, 24-7, such that different content of the memory pages 24-2, 24-7 would result in different verification values 42-1. In one example, the verification value 42-1 is a MD5 hash value.

The first hypervisor module 22 sends the verification value 42-1 and a group of memory page identifiers 44-1A, 44-1B that identify, respectively, the memory pages 24-2, 24-7 to the second hypervisor module 34. Note that the memory pages 24-2, 24-7 themselves may not be sent. The memory page identifiers 44-1A, 44-1B may comprise any suitable identifiers that can be used by the second hypervisor module 34 to identify the memory pages 36 in the memory 30 that correspond to the memory pages 24-2, 24-7. In some examples, the memory page identifiers 44-1A, 44-1B comprise memory address locations that identify the respective memory addresses where the memory pages 24-2, 24-7 are located. The first hypervisor module 22 also resets the dirty bits 26 associated with the memory pages 24-1, 24-5, and 24-8. In some examples, the first hypervisor module 22 generates a separate verification value 42-1 based on the content of each memory page 24-2, 24-7 and sends the group of separate verification values 42-1 in conjunction with the memory page identifiers 44-1A, 44-1B to the second hypervisor module 34.

The second hypervisor module 34 receives the set 40-1 of the memory pages 24-1, 24-5, and 24-8. The second hypervisor module 34 copies the content of the memory page 24-1 to the memory page 36-1, the content of the memory page 24-5 to the memory page 36-5, and the content of the memory page 24-8 to the memory page 36-8. The second hypervisor module 34 receives the verification value 42-1 and memory page identifiers 44-1A, 44-1B. The second hypervisor module 34 accesses the corresponding memory pages 36-2, 36-7 identified by the memory page identifiers 44-1A, 44-1B and generates a verification value based on the content of the memory pages 36-2, 36-7. The second hypervisor module 34 compares the generated verification value to the verification value 42-1. If the two verification values match, than the memory pages 36-2, 36-7 exactly match the memory pages 24-2, 24-7. If the two verification values do not match, then the memory pages 36-2, 36-7 do not exactly match the memory pages 24-2, 24-7. In such situation, the second hypervisor module 34 may perform any suitable action, such as generating an alert to an operator indicating a mismatch in memory between the second computing device 14 and the first computing device 12. Alternatively, or additionally, the second hypervisor module 34 may send a request to the first hypervisor module 22 requesting copies of the memory pages 24-2, 24-7.

The first hypervisor module 22 performs another iteration at a time T2. At the time T2, the first hypervisor module 22 determines that a set 40-2 of the memory pages 24-6, 24-7 have been modified since the previous iteration performed at the time T1 based on the associated dirty bits 26. The first hypervisor module 22 sends the set 40-2 of the memory pages 24-6, 24-7 to the second hypervisor module 34. The first hypervisor module 22 randomly identifies a second set of memory pages 24-3, 24-8 and generates a verification value 42-2 based on the content of the memory pages 24-3, 24-8. The first hypervisor module 22 sends the verification value 42-2 and memory page identifiers 44-2A, 44-2B that identify, respectively, the memory pages 24-3, 24-8 to the second hypervisor module 34.

This iterative process may continue indefinitely. Over time, each memory page 24 and memory page 36 will be synchronized repeatedly, ensuring that the memory pages 24 exactly match the memory pages 36.

Figure 2:
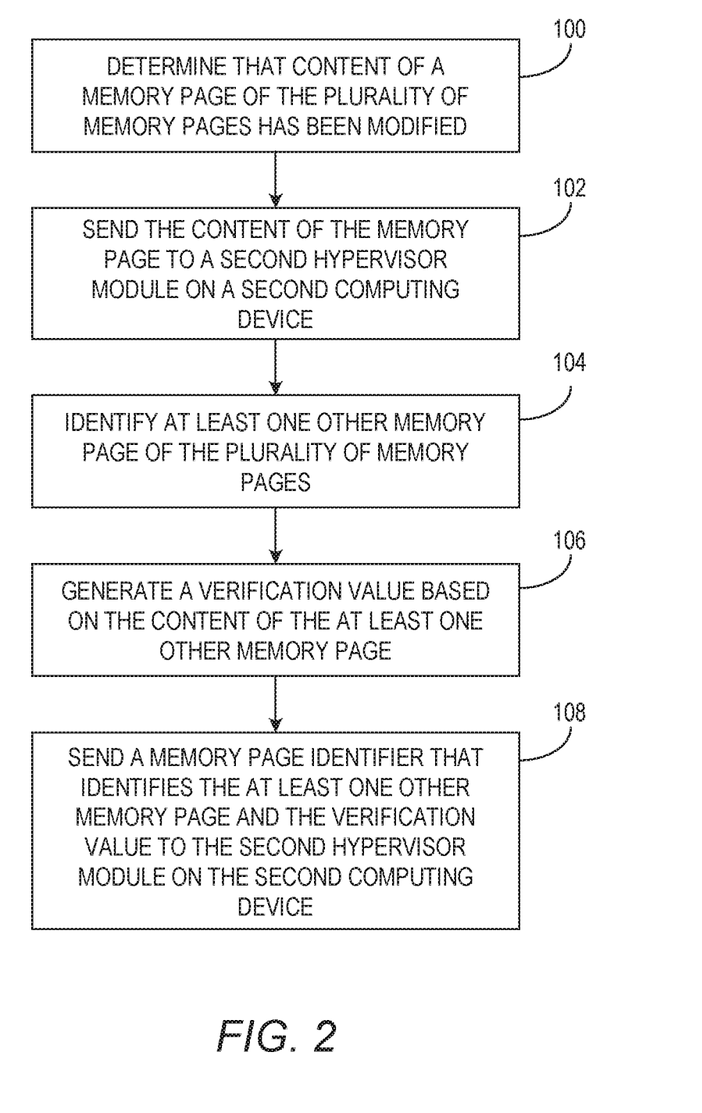
FIG. 2 is a flowchart of a process for reducing memory inconsistencies between two synchronized computing devices according to one example.

FIG. 2 is a flowchart of a process for reducing memory inconsistencies between two synchronized computing devices according to one example. FIG. 2 will be discussed in conjunction with FIG. 1. At the time T1, the first hypervisor module 22 determines that the memory pages 24-1, 24-5, and 24-8 have been modified, based on the associated dirty bits 26 (FIG. 2, block 100). The first hypervisor module 22 sends the memory pages 24-1, 24-5, and 24-8 to the second hypervisor module 34 on the second computing device 14 (FIG. 2, block 102). The first hypervisor module 22 identifies the other memory pages 24-2, 24-7 (FIG. 2, block 104). The first hypervisor module 22 generates the verification value 42-1 based on the content of the memory pages 24-2, 24-7 (FIG. 2, block 106). The first hypervisor module 22 sends the memory page identifiers 44-1A, 44-1B that identify, respectively, the memory pages 24-2, 24-7 and the verification value 42-1 to the second hypervisor module 34 (FIG. 2, block 108).

Figure 3:
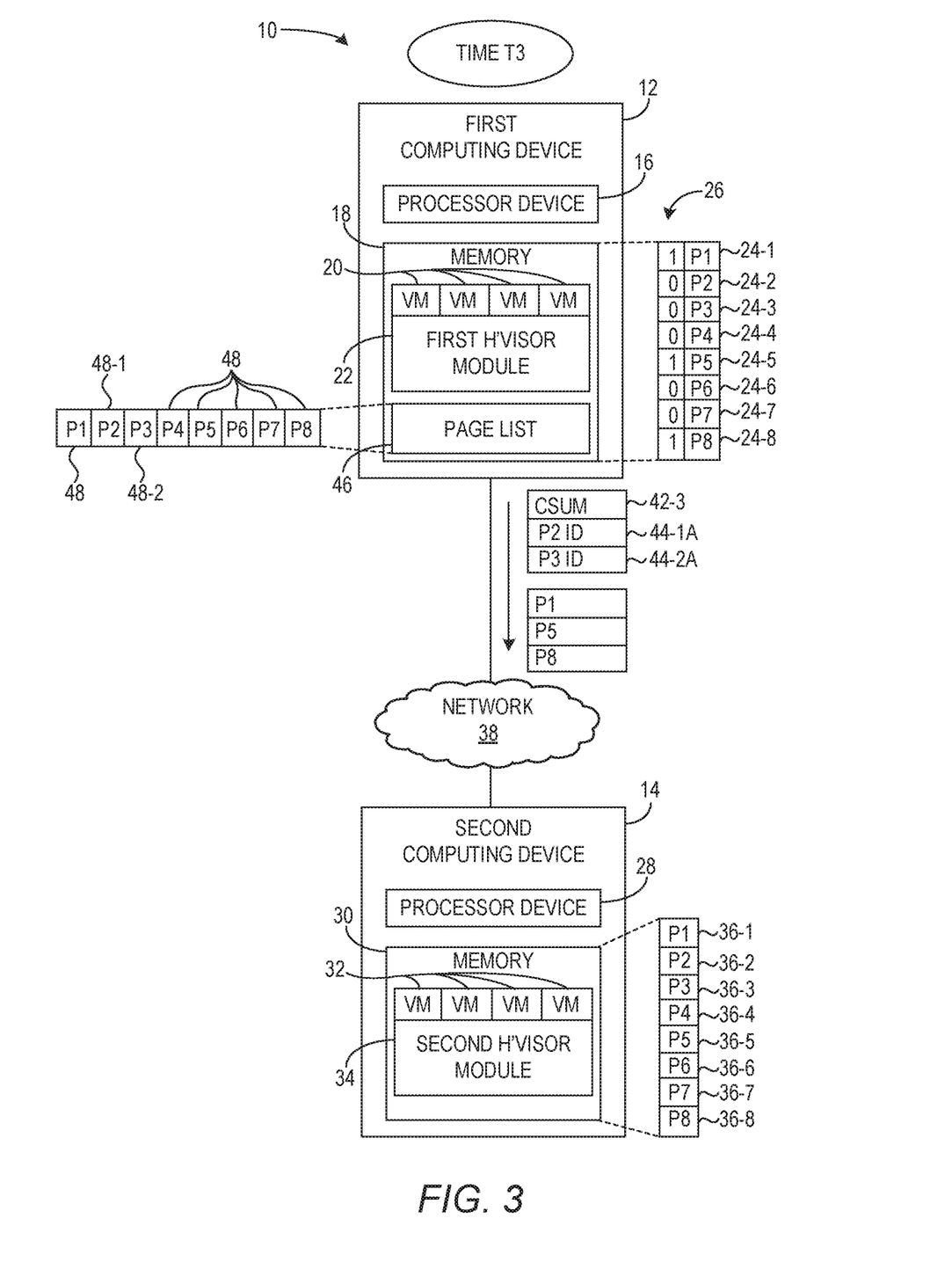
FIG. 3 is a block diagram of the environment illustrated in FIG. 1 according to another example wherein memory pages are identified according to a page list of memory pages.

FIG. 3 is a block diagram of the environment 10 according to another example wherein memory pages 24 are identified according to a page list of memory pages. In this example, assume that at a time T3 the first hypervisor module 22 determines that the memory pages 24-1, 24-5, and 24-8 have been modified based on the corresponding dirty bits 26 associated with the memory pages 24-1, 24-5, and 24-8. The first hypervisor module 22 sends the memory pages 24-1, 24-5, and 24-8 to the second hypervisor module 34. The first hypervisor module 22 accesses a page list 46 comprising a plurality of entries 48, 48-1, 48-2, each entry 48 identifying one of the memory pages 24. The first hypervisor module 22 may then select a set of memory pages 24 identified in the page list 46. In one example, the first hypervisor module 22 selects entries 48 from the page list 46 that identify memory pages 24 that have not been modified since the previous iteration. In some examples, the first hypervisor module 22 may randomly select the entries 48 from the page list 46. In other examples, the first hypervisor module 22 may select entries 48 sequentially. In this example, assume that the first hypervisor module 22 selects the entries 48-1 and 48-2 that identify the memory pages 24-2 and 24-3, respectively. The first hypervisor module 22 generates a verification value 42-3 based on the content of the memory pages 24-2, 24-3. The first hypervisor module 22 sends the memory page identifiers 44-1A, 44-2A that identify the memory pages 24-2, 24-3 and the verification value 42-3 to the second hypervisor module 34. The first hypervisor module 22 then removes the entries 48-1, 48-2 from the page list 46.

Figure 4:
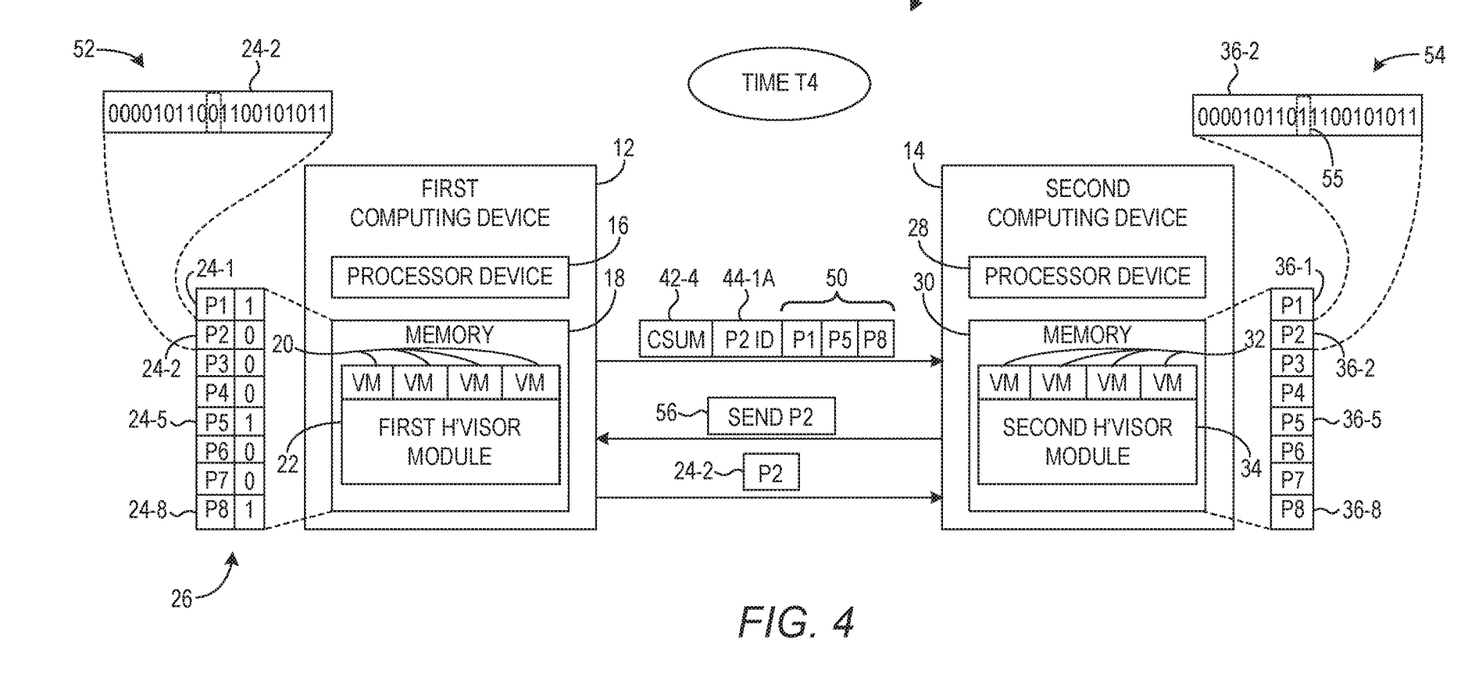
FIG. 4 is a block diagram of the environment illustrated in FIG. 1 according to another example.

FIG. 4 is a block diagram of the environment 10 according to another example. In this example, the second hypervisor module 34 receives a set 50 of the memory pages 24-1, 24-5, and 24-8 from the first hypervisor module 22 during at a time T4. The second hypervisor module 34 copies the memory pages 24-1, 24-5, and 24-8 to the memory pages 36-1, 36-5, and 36-8, respectively. The second hypervisor module 34 also receives the memory page identifier 44-1A that identifies the memory page 24-2 and receives a verification value 42-4 that was generated by the first hypervisor module 22 based on content 52 of the memory page 24-2. The second hypervisor module 34 generates a verification value based on content 54 of the memory page 36-2.

Although at a previous point in time the content 54 matched the content 52, at some subsequent point in time a bit 55 changed values from a '0' to a1'. Because of this change in value, the verification value generated by the second hypervisor module 34 does not match the verification value 42-4 received from the first hypervisor module 22.

The second hypervisor module 34 sends a request 56 to the first hypervisor module 22 requesting that a copy of the memory page 24-2 be sent to the second hypervisor module 34. In response, the first hypervisor module 22 sends the memory page 24-2 to the second hypervisor module 34, which copies the memory page 24-2 to the memory page 36-2, synchronizing the content 54 with the content 52. In other examples, if the verification value 42-4 was based on a plurality of memory pages 24, the second hypervisor module 34 would send a request for each of the memory pages 24 from which the verification value 42-4 was generated.

Figure 5:
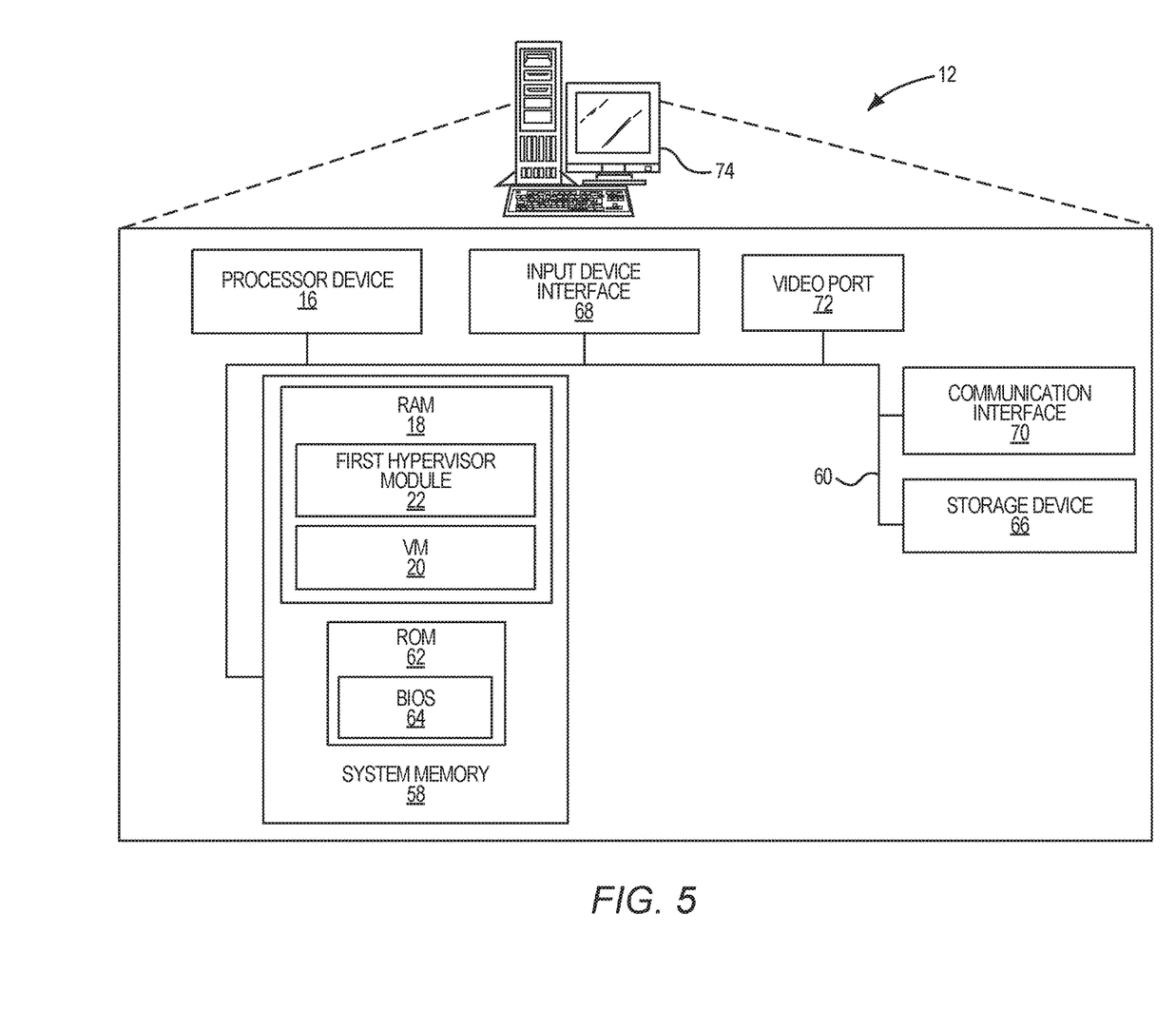
FIG. 5 is a block diagram of a first computing device according to one example.

FIG. 5 is a block diagram of the first computing device 12 suitable for implementing examples according to one example. The first computing device 12 may comprise any computing or electronic device capable of including firmware, hardware, and/or executing software instructions to implement the functionality described herein, such as a computer server, a desktop computing device, a laptop computing device, or the like. The first computing device 12 includes the processor device 16, a system memory 58, and a system bus 60. The system bus 60 provides an interface for system components including, but not limited to, the system memory 58 and the processor device 16. The processor device 16 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The system memory 58 may include non-volatile memory 62 (e.g., read-only memory (ROM), erasable programmable read-only memory (EPROM), electrically erasable programmable read-only memory (EEPROM), etc.), and the volatile memory 18 (e.g., random-access memory (RAM)). A basic input/output system (BIOS) 64 may be stored in the non-volatile memory 62 and can include the basic routines that help to transfer information between elements within the first computing device 12. The volatile memory 18 may also include a high-speed RAM, such as static RAM, for caching data.

The first computing device 12 may further include or be coupled to a non-transitory computer-readable storage medium or storage device 66, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 66 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 66 and in the volatile memory 18, including the first hypervisor module 22, and one or more VMs 20.

All or a portion of the examples may be implemented as a computer program product stored on a transitory or non-transitory computer-usable or computer-readable storage medium, such as the storage device 66, which includes complex programming instructions, such as complex computer-readable program code, configured to cause the processor device 16 to carry out the steps described herein. Thus, the computer-readable program code can comprise software instructions for implementing the functionality of the examples described herein when executed on the processor device 16. The processor device 16, in conjunction with the first hypervisor module 22 in the volatile memory 18, may serve as a controller, or control system, for the first computing device 12 that is configured to, or adapted to, implement the functionality described herein.

An operator or other user may also be able to enter one or more configuration commands through a keyboard (not illustrated), a pointing device such as a mouse (not illustrated), or a touch-sensitive surface (not illustrated). Such input devices may be connected to the processor device 16 through an input device interface 68 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like.

The first computing device 12 may also include a communication interface 70 suitable for communicating with the network 38 as appropriate or desired. The first computing device 12 may also include a video port 72 configured to interface with a display 74, to provide information to the operator.

Individuals will recognize improvements and modifications to the examples of the disclosure. All such improvements and modifications are considered within the scope of the concepts disclosed herein and the claims that follow.

What is claimed is:
1. A computing system comprising:
a first computing device comprising:
a first random access memory (RAM) comprising a plurality of memory pages;
a first processor device coupled to the RAM; and
a first hypervisor module that interfaces with the first processor device and is to iteratively:
determine that content of a memory page of the plurality of memory pages has been modified;
send the content of the memory page to a second hypervisor module on a second computing device;
identify, for corruption-detection purposes, at least one other memory page of the plurality of memory pages that was previously sent to the second computing device, the at least one other memory page being identified without receipt of a request from the second computing device related to the at least one other memory page;
generate a verification value based on content of the at least one other memory page; and
send the verification value and a memory page identifier that identifies the at least one other memory page to the second hypervisor module on the second computing device without sending the content of the at least one other memory page to facilitate a determination by the second computing device of whether the at least one other memory page that was previously sent to the second computing device is corrupted.

2. The computing system of claim 1, wherein to identify the at least one other memory page, the first hypervisor module is further to randomly identify the at least one other memory page from the plurality of memory pages.

3. The computing system of claim 1, wherein to identify, the at least one other memory page, the first hypervisor module is further to determine that the content of the at least one other memory page is unmodified.

4. The computing system of claim 3, wherein to determine that the content of the at least one other memory page is unmodified, the first hypervisor module is further to determine that a modified memory page bit associated with the at least one other memory page indicates that the content of the at least one other memory page is unmodified.

5. The computing system of claim 1, wherein the at least one other memory page comprises a group of memory pages, and the first hypervisor module is further to:
generate a plurality of verification values, each verification value associated with a respective different memory page in the group of memory pages and generated based on content contained in the respective different memory page in the group of memory pages; and
send a group of memory page identifiers, each memory page identifier identifying a corresponding one of the memory pages in the group of memory pages, and the plurality of verification values to the second hypervisor module without sending content of the group of memory pages to allow the second hypervisor module to verify that a copy of the group of memory pages maintained by the second hypervisor module is identical to the group of memory pages.

6. The computing system of claim 1, wherein:
the at least one other memory page comprises a group of memory pages;
to generate the verification value based on the content of the at least one other memory page, the first hypervisor module is further to generate the verification value based on content of each memory page in the group of memory pages; and
to send the verification value and the memory page identifier that identifies the at least one other memory page to the second hypervisor module on the second computing device, the first hypervisor module is further to send a group of memory page identifiers, each memory page identifier identifying a corresponding one of the memory pages in the group of memory pages, and the verification value to the second hypervisor module without sending content of the group of memory pages to allow the second hypervisor module to verify that a copy of the group of memory pages maintained by the second hypervisor module is identical to the group of memory pages.

7. The computing system of claim 1, wherein the first hypervisor module is further to mark the content of the memory page as being unmodified.

8. The computing system of claim 1, wherein the verification value is a MD5 hash value.

9. The computing system of claim 1, wherein to identify the at least one other memory page, the first hypervisor module is to further:
identify the at least one other memory page from a set of memory pages identified on a page list of memory pages; and remove the at least one other memory page from the page list.

10. The computing system of claim 1, wherein the memory page identifier is a memory page address.

11. The computing system of claim 1, wherein the first hypervisor module is to further:
receive a request from the second computing device for the content of the at least one other memory page; and
send the content of the at least one other memory page to the second computing device in response to the request from the second computing device for the content of the at least one other memory page.

12. The computing system of claim 1 further comprising:
the second computing device comprising:
a second RAM;
a second processor device coupled to the second RAM; and
the second hypervisor module that interfaces with the second processor device and is to:
receive the at least one other memory page of the plurality of memory pages;
copy the at least one memory page into a memory page of the second RAM;
subsequent to receiving the at least one other memory page, receive the verification value and the memory page identifier;
in response to receiving the verification value and the memory page identifier, access the at least one other memory page identified by the memory page identifier and determine that the memory page of the second RAM has not become corrupted based on the verification value; and
in response to determining that the memory page of the second RAM has not become corrupted, not sending a request to the first computing device for a copy of the at least one other memory page.

13. A method comprising:
determining, by a first hypervisor module executing on a first computing device comprising a first processor device, that content of a memory page of a plurality of memory pages in a random access memory (RAM) has been modified;
sending the content of the memory page to a second hypervisor module on a second computing device;
identifying, for corruption-detection purposes, at least one other memory page of the plurality of memory pages that was previously sent to the second computing device the at least one other memory page being identified without receipt of a request from the second computing device;
generating a first verification value based on content of the at least one other memory page;
sending, without receipt of a request from the second hypervisor module for the first verification value, the first verification value and a memory page identifier that identifies the at least one other memory page to the second hypervisor module on the second computing device without sending the content of the at least one other memory page;
receiving, by the second hypervisor module, the at least one other memory page of the plurality of memory pages;
copying the at least one other memory page into a memory page of a second RAM;
subsequent to receiving the at least one other memory page, receiving the first verification value and the memory page identifier;

in response to receiving the first verification value and the memory page identifier, accessing the at least one other memory page identified by the memory page identifier and determining that the memory page of the second RAM has become corrupted based on the first verification value;

sending a request to the first computing device for a copy of the at least one other memory page;

receiving the copy of the at least one other memory page; and replacing the memory page of the second RAM with the copy of the at least one other memory page.

14. The method of claim 13 wherein identifying the at least one other memory page further comprises randomly identifying the at least one other memory page from the plurality of memory pages.

15. The method of claim 13 wherein the at least one other memory page comprises a group of memory pages, and further comprising:

generating a plurality of first verification values, each first verification value associated with a respective different memory page in the group of memory pages and generated based on content contained in the respective different memory page in the group of memory pages; and sending a group of memory page identifiers, each memory page identifier identifying a corresponding one of the memory pages in the group of memory pages, and the plurality of first verification values to the second hypervisor module without sending content of the group of memory pages to allow the second hypervisor module to verify that a copy of the group of memory pages maintained by the second hypervisor module is identical to the group of memory pages.

16. The method of claim 13, wherein the at least one other memory page comprises a group of memory pages and wherein:

generating the first verification value based on the content of the at least one other memory page comprises generating the first verification value based on content of each memory page in the group of memory pages; and sending the first verification value and the memory page identifier that identifies the at least one other memory page to the second hypervisor module on the second computing device comprises sending a group of memory page identifiers, each memory page identifier identifying a corresponding one of the memory pages in the group of memory pages, and the first verification value to the second hypervisor module without sending content of the group of memory pages to allow the second hypervisor module to verify that a copy of the group of memory pages maintained by the second hypervisor module is identical to the group of memory pages.

17. The method of claim 13 further comprising:

receiving a request from the second computing device for the content of the at least one other memory page; and sending the content of the at least one other memory page to the second computing device in response to the request from the second computing device for the content of the at least one other memory page.

18. A computing device comprising:

a random access memory (RAM) comprising a plurality of memory pages;

a processor device coupled to the RAM; and a first hypervisor module that interfaces with the processor device and is to iteratively:

determine that content of a memory page of the plurality of memory pages has been modified;

send the content of the memory page to a second hypervisor module on a second computing device;

identify, for corruption-detection purposes, at least one other memory page of the plurality of memory pages that was previously sent to the second computing device, the at least one other memory page being identified without receipt of a request from the second computing device;

generate a first verification value based on content of the at least one other memory page; and send the first verification value and a memory page identifier that identifies the at least one other memory page to the second hypervisor module on the second computing device without sending the content of the at least one other memory page, so that the second computing device can calculate a second verification value for the at least one other memory page that was previously sent to the second computing device and determine whether the at least one other memory page that was previously sent to the second computing device has become corrupted by comparing the first verification value and the second verification value.

* * * * *